United States Patent
Lema et al.

(10) Patent No.: US 11,022,969 B2
(45) Date of Patent: *Jun. 1, 2021

(54) SYSTEMS AND METHODS FOR CONTROLLING AN UNMANNED AERIAL VEHICLE

(71) Applicant: GoPro, Inc., San Mateo, CA (US)

(72) Inventors: Pablo Lema, Burlingame, CA (US); Shu Ching Ip, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 254 days.

This patent is subject to a terminal disclaimer.

(21) Appl. No.: 16/203,712

(22) Filed: Nov. 29, 2018

(65) Prior Publication Data

US 2019/0094851 A1 Mar. 28, 2019

Related U.S. Application Data

(63) Continuation of application No. 15/606,700, filed on May 26, 2017, now Pat. No. 10,175,687, which is a continuation of application No. 14/978,782, filed on Dec. 22, 2015, now Pat. No. 9,663,227.

(51) Int. Cl.
*B64C 39/00* (2006.01)
*G06K 7/10* (2006.01)
*G05D 1/00* (2006.01)
*B64C 39/02* (2006.01)

(52) U.S. Cl.
CPC ......... *G05D 1/0016* (2013.01); *B64C 39/024* (2013.01); *G05D 1/0094* (2013.01); *G06K 7/10* (2013.01); *B64C 2201/027* (2013.01); *B64C 2201/127* (2013.01); *B64C 2201/146* (2013.01)

(58) Field of Classification Search
CPC ...... G05D 1/00; G05D 1/0016; G05D 1/0094; B64C 39/00; B64C 39/024; B64C 2201/027; B64C 2201/127; B64C 2201/146; G06K 7/00; G06K 7/10
See application file for complete search history.

(56) References Cited

U.S. PATENT DOCUMENTS

| | | |
|---|---|---|
| 3,180,205 A | 4/1965 | Heppe |
| 6,141,034 A | 10/2000 | McCutchen |
| 9,158,304 B2 | 10/2015 | Fleck |
| 9,409,646 B2 | 8/2016 | Fleck |
| 9,663,227 B1 * | 5/2017 | Lema ................. G05D 1/0016 |
| 10,175,687 B2 * | 1/2019 | Lema ................. G05D 1/0094 |
| 2002/0180759 A1 | 12/2002 | Park |
| 2005/0062869 A1 | 3/2005 | Zimmermann |
| 2009/0251530 A1 | 10/2009 | Cilia |

(Continued)

*Primary Examiner* — Yonel Beaulieu
(74) *Attorney, Agent, or Firm* — Young Basile Hanlon & MacFarlane, P.C.

(57) ABSTRACT

Systems and methods for controlling an unmanned aerial vehicle are disclosed. The system comprises an image sensor configured to generate output signals conveying visual information, the visual information including one or more images of a user, and one or more physical processors. The one or more physical processors are configured by computer-readable instructions to recognize one or more gestures from the user based on the visual information, interpret the one or more gestures from the user as flight control information, and provide flight control for the unmanned aerial vehicle based on the flight control information.

20 Claims, 4 Drawing Sheets

(56) References Cited

U.S. PATENT DOCUMENTS

| | | |
|---|---|---|
| 2010/0250022 A1 | 9/2010 | Hines |
| 2012/0154785 A1 | 6/2012 | Gilliland |
| 2013/0166103 A1 | 6/2013 | Ko |
| 2014/0036064 A1 | 2/2014 | Lu |
| 2014/0132804 A1 | 5/2014 | Guissin |
| 2014/0192144 A1 | 7/2014 | St. Clair |
| 2014/0240464 A1 | 8/2014 | Lee |
| 2014/0267596 A1 | 9/2014 | Geerds |
| 2014/0362176 A1 | 12/2014 | St. Clair |
| 2015/0057917 A1 | 2/2015 | Cheng |
| 2015/0071524 A1 | 3/2015 | Lee |
| 2015/0142211 A1 | 5/2015 | Shehata |
| 2015/0160658 A1 | 6/2015 | Reedman |
| 2015/0166476 A1 | 6/2015 | Chen |
| 2015/0304532 A1 | 10/2015 | Bart |
| 2015/0336015 A1 | 11/2015 | Blum |
| 2015/0350614 A1 | 12/2015 | Meier |
| 2015/0363648 A1 | 12/2015 | Li |
| 2015/0367958 A1 | 12/2015 | Lapstun |
| 2015/0370250 A1 | 12/2015 | Bachrach |
| 2016/0018822 A1 | 1/2016 | Nevdahs |
| 2016/0031559 A1 | 2/2016 | Zang |
| 2016/0037068 A1 | 2/2016 | Jenny |
| 2016/0054737 A1 | 2/2016 | Soll |
| 2016/0076892 A1 | 3/2016 | Zhou |
| 2016/0101856 A1 | 4/2016 | Kohstall |
| 2016/0105609 A1 | 4/2016 | Pettegrew |
| 2016/0129999 A1 | 5/2016 | Mays |
| 2016/0139596 A1 | 5/2016 | Na |
| 2016/0139602 A1 | 5/2016 | Kohstall |
| 2016/0179096 A1 | 6/2016 | Bradlow |
| 2016/0189101 A1 | 6/2016 | Kantor |
| 2016/0259330 A1 | 9/2016 | Lacaze |
| 2016/0274338 A1 | 9/2016 | Davies |
| 2016/0286119 A1 | 9/2016 | Rondinelli |
| 2016/0295108 A1 | 10/2016 | Cao |
| 2016/0304198 A1 | 10/2016 | Jourdan |
| 2016/0306351 A1 | 10/2016 | Fisher |
| 2016/0327950 A1* | 11/2016 | Bachrach ............. G05D 1/0094 |
| 2016/0336020 A1 | 11/2016 | Bradlow |
| 2016/0344981 A1 | 11/2016 | Lunt |
| 2016/0349599 A1 | 12/2016 | Macmillan |
| 2016/0360104 A1 | 12/2016 | Zhang |
| 2016/0376004 A1 | 12/2016 | Claridge |
| 2017/0006340 A1 | 1/2017 | Enke |
| 2017/0041553 A1 | 2/2017 | Cao |
| 2017/0123425 A1 | 5/2017 | Zhao |
| 2018/0067482 A1* | 3/2018 | Lema .................... G06K 9/0063 |
| 2020/0218252 A1* | 7/2020 | Lema ................. G06K 9/00718 |

* cited by examiner

SYSTEMS AND METHODS FOR CONTROLLING AN UNMANNED AERIAL VEHICLE

CROSS-REFERENCE TO RELATED APPLICATION(S)

This application is a continuation of U.S. patent application Ser. No. 15/606,700, filed May 26, 2017, now U.S. Pat. No. 10,175,687, which is a continuation of U.S. patent application Ser. No. 14/978,782, filed Dec. 22, 2017, now U.S. Pat. No. 9,663,227, the entire disclosures of which are hereby incorporated by reference.

TECHNICAL FIELD

The invention relates to flight control for unmanned aerial vehicles that include sensors, and, in particular, to interpreting gestures by a user to adjust the operation of an unmanned aerial vehicle and/or its sensors.

BACKGROUND

It is known that unmanned aerial vehicles, or UAVs, may be equipped with automated flight control, remote flight control, programmable flight control, and/or other types of flight control, and/or combinations thereof. Some UAVs may carry sensors, including but not limited to image sensors configured to capture image information.

SUMMARY

One aspect of the invention relates to a system for controlling an unmanned aerial vehicle. An unmanned aerial vehicle may be referred to as UAV. The term "unmanned" refers to the capability of the aerial vehicle to operate without requiring a human operator onboard during a flight. In other words, at least some portion of the flight control may be provided remotely and/or by an autopilot (also referred to as a control system or a control subsystem or a flight control subsystem). In some implementations, a UAV may carry passengers, cargo, sensors, and/or other physical objects. In some implementations, a UAV may operate autonomously. Alternatively, and/or simultaneously, in some implementations, at least some functionality of a UAV may be controlled and/or modified through remote control, e.g. by a person, for at least some portion of a flight. For example, a human may control and/or assist remotely in a particular maneuver, such as a take-off or landing.

Autonomous operation and remote control operation may be provided during the same flight. By way of non-limiting example, the modes of operation of a UAV may include autonomous operation, remote control operation, combinations thereof, and/or other modes of operation. UAVs may have varying degrees of autonomy.

A control system may provide one or more of stabilization control, navigation control, altitude control, propulsion control, engine control, and/or other functions needed and/or used during operation of a UAV, which may jointly be referred to as flight control. By way of non-limiting example, a UAV may be configured to provide one or more of the following functions: capture and/or interpret visual information, ground imagery, and/or surrounding imagery, capture and/or interpret sensor data (e.g. radar data), plan a path for the UAV, determine one or more maneuvers to follow or maintain a particular path and/or other goal or target, to reach a particular destination, or to accomplish a goal or target, avoid obstacles and/or collisions, accommodate in-flight instructions (e.g. from a user and/or a control tower or similar authority), coordinate with external agents (e.g. other UAVs), and/or other functions.

In some implementations, a UAV may be controlled by a system that supports multiple modes of autonomous operation and/or multiple modes of remote control operation.

A UAV may be a fixed wing aircraft, a helicopter, a multi-rotor aircraft (e.g. a quadcopter), a rotary wing aircraft, and/or another type of aircraft. In some implementations, a UAV may combine features of multiple types of aircraft. A UAV may include one or more components configured to provide lift force. By way of non-limiting example, the one or more components providing lift force may include one or more wings, airfoils, propellers, rotors, rotor discs, and/or other components.

The system for controlling a UAV may include one or more of a housing, a flight control subsystem, one or more sensors, a sensor control subsystem, a remote controller, a controller interface, one or more physical processors, one or more computer program components, and/or other components. An individual subsystem may include one or more sensors, one or more physical processors, one or more computer program components, and/or other components.

The flight control subsystem may be configured to provide flight control for the UAV. Operation of the flight control subsystem may be based on flight control information. Flight control information may be based on information and/or parameters determined and/or obtained by the system for controlling the UAV. In some implementations, flight control information may be transmitted by the remote controller. In some implementations, flight control information may be received by the controller interface.

Individual sensors may be configured to generate output signals conveying information. The information may include visual information. The information may be related to one or more flight parameters of a UAV. Flight parameters of a UAV may include, by way of non-limiting example, altitude, barometric pressure, (geographical) location, longitude, latitude, (3-dimensional) position, roll, yaw, pitch, tilt, angular rate, attack angle, slide-slip angle, heading, speed, magnetometric measurement, cardinal direction (e.g. relative to a target), distance from a target, estimated time to reach a target, and/or other flight parameters. In some implementations, individual flight parameter may represent a current status or condition of the UAV, e.g. as measured, derived, estimated, approximated, and/or otherwise determined based on one or more output signals generated by one or more sensors.

Sensors may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, global positioning system sensors, a tilt sensor, a motion sensor, a vibration sensor, an image sensor, a camera, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. In some implementations, an individual subsystem may include (and/or be associated with) one, two, three, four, or more sensors. Different control subsystems may include and/or be associated with different sensors.

Individual sensors may include image sensors, cameras, depth sensors, remote sensors, and/or other sensors. As used herein, the terms "camera" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, time-stamped, annotated, and/or otherwise processed such that information captured by other sensors can be synchronized, aligned, annotated, and/or otherwise associated therewith. For example, video information captured by an image sensor may be synchronized with information captured by an accelerometer. Associated information from multiple sensors may be used, e.g., subsequent to information being captured, to create multimedia content based on the captured information.

The sensor control subsystem may be configured to control sensors included in the system for controlling the UAV, and/or other sensors. Operation of the sensor control subsystem may be based on sensor control information. Sensor control information may be based on information and/or parameters determined and/or obtained by the system for controlling the UAV. In some implementations, sensor control information may be transmitted by the remote controller. In some implementations, sensor control information may be received by the controller interface. In some implementations, the sensor control subsystem may be configured to control one or more image sensors such that the visual information captured by the one or more image sensors includes an image of a particular object or user.

Individual physical processors may be configured via computer-readable instructions to provide information-processing capabilities and/or execute computer program components. The computer program components may include one or more of a parameter determination component, a flight control component, a sensor control component, a gesture interpretation component, a projection component, a pattern recognition component, and/or other components.

The parameter determination component may be configured to determine flight parameters and/or other parameters related to a UAV based on output signals from sensors. For example, the parameter determination component may be configured to determine an altitude of the UAV based on a sensor, e.g. an altimeter. For example, the parameter determination component may be configured to determine a distance between the UAV and a particular object based on information from a sensor, e.g. an image sensor.

The flight control component may be configured to determine control parameters based on output signals from sensors, flight parameters, and/or other parameters. Control parameters may control operation of a UAV. Control parameters may control one or more of the stabilization, navigation, altitude, propulsion, engine operations, and/or other functions needed and/or used during operation of a UAV. Control parameters may be used to provide flight control for a UAV. By way of non-limiting example, control parameters may correspond to the signals that control the power and/or thrust generated by a motor and/or engine, the positions of one or more ailerons, an elevator, one or more rudders, one or more throttles, rotation rates of one or more rotor discs, and/or other signals that control operation of a UAV. Different types of UAV may operate using different sets of control parameters. In some implementations, control parameters may include particular targets or goals for a UAV and/or for one or more flight parameters of a UAV. For example, a control parameter may include or be related to one or more of a particular destination, a particular flight path, a target altitude, a target arrival time and/or flight duration, and/or other targets or goals for a UAV.

The sensor control component may be configured to determine sensor parameters based on output signals from sensors, flight parameters, and/or other parameters. Sensor parameters may control operation of a sensor. For example, sensor parameters may be related to the operation of an image sensor. In some implementations, the sensor parameters may control one or more of aperture timing, exposure, focal length, angle of view, depth of field, focus, light metering, white balance, resolution, frame rate, object of focus, capture angle, a zoom parameter, video format, a sound parameter, a compression parameter, and/or other parameters.

The gesture interpretation component may be configured to recognize and/or interpret gestures from users. By way of non-limiting example, gestures may be interpreted as one or both of flight control information and sensor control information. In some implementations, gestures may be accompanied by other types of user input, including but not limited to an auditory command and/or request, a manipulation of a user interface element (e.g. a button or switch), a tactile action (e.g. tapping the remote controller twice to prime the system for recognizing a gesture), and/or other types of user input.

The projection component may be configured to project a pattern on an object or user. In some implementations, the pattern may be a visual pattern. For example, the pattern may include a barcode, a Quick Response (QR) code, a target, and/or other patterns, and/or combinations thereof. In some implementations, particular information (including but not limited to commands, requests, targets, goals, etc.) may be embedded in a pattern.

The pattern recognition component may be configured to recognize and/or interpret patterns, including but not limited to patterns projected by the projection component. By way of non-limiting example, patterns may be interpreted as one or both of flight control information and sensor control information.

The remote controller may be configured to transmit information, including but not limited to flight control information, sensor control information, and/or other information. In some implementations, the remote controller may be a separate, distinct, and/or physically independent component of the system. In some implementations, the remote controller may be a separate, distinct, and/or physically independent component from the UAV and/or the housing. In some implementations, the remote controller may be configured to be supported, worn, held, and/or carried by a user. In some implementations, the remote controller may include a user interface configured to receive user input. The user input may include flight control information, sensor control information, and/or other information. In some implementations, the user input may include gestures by the user. In some implementations, the gesture interpretation component may be included in the remote controller.

The controller interface may be configured to determine and/or receive flight control information, sensor control information, and/or other information. For example, the controller interface may be configured to receive flight control information and/or sensor control information from the remote controller. In some implementations, the controller interface may be included, combined, embedded, and/or otherwise form an integral part of the UAV.

One aspect of the invention relates to methods for controlling an unmanned aerial vehicle.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
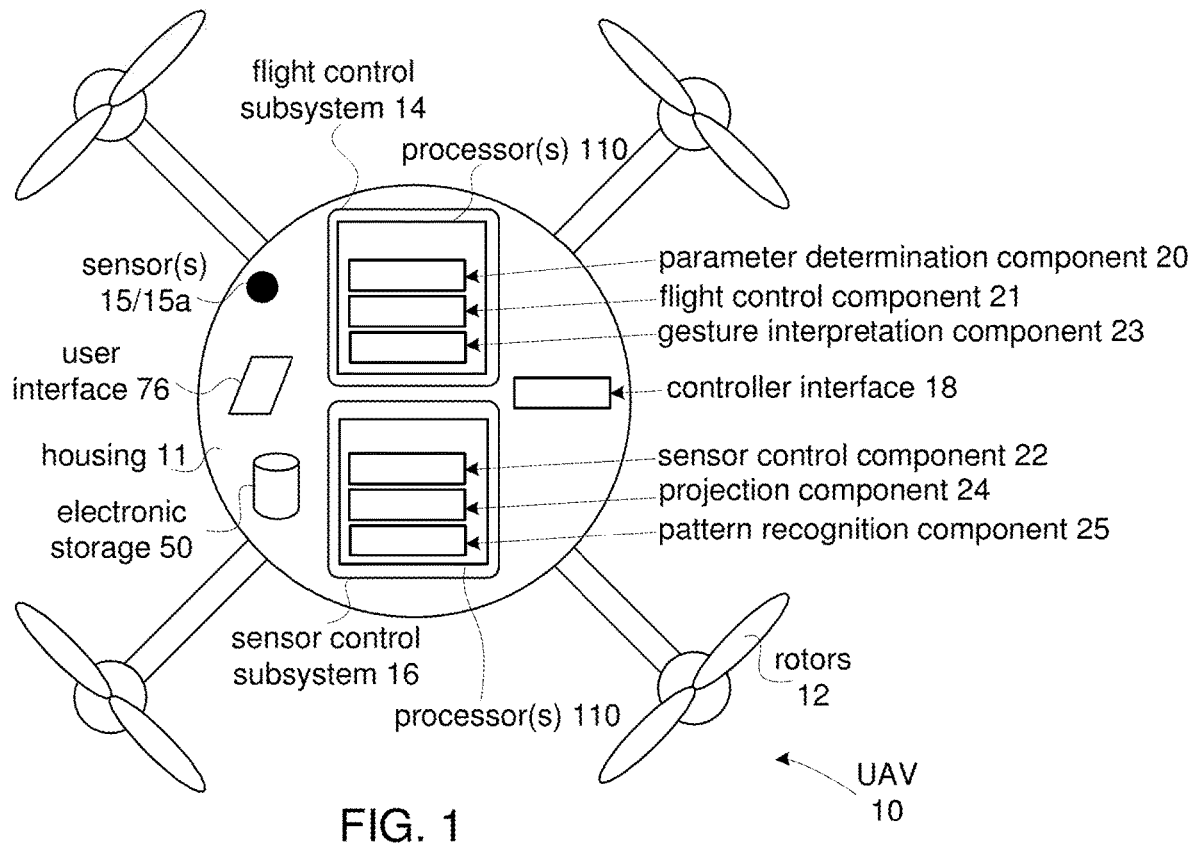
FIG. 1 schematically illustrates an unmanned aerial vehicle in accordance with one or more implementations.

FIG. 1 schematically illustrates an unmanned aerial vehicle 10 (also referred to as UAV 10), in particular a quadcopter. This quadcopter is an exemplary and non-limiting implementation of UAV 10. As illustrated in FIG. 1, UAV 10 may include four rotors 12. The number of rotors of UAV 10 is not intended to be limited by any depiction. In some implementations, UAV 10 may include zero, one, two, three, four, five, six, and/or more than six rotors. UAV 10 may include one or more of a housing 11, a flight control subsystem 14, one or more sensors 15, a sensor control subsystem 16, a remote controller 17 (shown in FIG. 2 as being worn or held by a user 101), a controller interface 18, one or more physical processors 110, electronic storage 50, a user interface 76, and/or other components. In some implementations, remote controller 17 may operate as a beacon to guide UAV 10.

Housing 11 may be configured to support, hold, and/or carry UAV 10 and/or components thereof. The combination of housing 11 and UAV 10 and/or components supported, held, and/or carried by housing 11 may be referred to as a system for controlling an unmanned aerial vehicle.

Flight control subsystem 14 may include one or more physical processors 110, and/or other components. Sensor control subsystem 16 may include one or more physical processors 110, and/or other components. The depiction in FIG. 1 of a single sensor 15, here depicted as a sensor 15a, is not intended to be limiting in any way. UAV 10 may include one sensor, two sensors, three sensors, and/or more than three sensors.

Flight control subsystem 14 may be configured to provide flight control for UAV 10. Operation of flight control subsystem 14 may be based on flight control information. Flight control information may be based on information and/or parameters determined and/or obtained to control UAV 10. In some implementations, providing flight control may include functions including, but not limited to, flying UAV 10 in a stable manner, tracking people or objects, avoiding collisions, and/or other functions useful for autonomously flying unmanned aerial vehicles. In some implementations, flight control information may be transmitted by remote controller 17. In some implementations, flight control information may be received by controller interface 18.

One or more sensors 15 may be configured to generate output signals conveying information. The information may include visual information, video information, audio information, geolocation information, orientation and/or motion information, depth information, and/or other information. Information captured by one or more sensors 15 may be marked, timestamped, annotated, and/or otherwise processed such that information captured by other sensors (from one or more sensors 15 of UAV 10) can be synchronized, aligned, annotated, and/or otherwise associated therewith. In some implementations, the conveyed information may be related to one or more flight parameters of UAV 10. In some implementations, the conveyed information may be related to sensor parameters. In some implementations, the conveyed information may be related to persons and/or objects near UAV 10 and/or user 101. In some implementations, an individual flight parameter may represent a current status or condition of UAV 10, e.g. as measured, derived, estimated, approximated, and/or otherwise determined based on one or more output signals generated by one or more sensors 15.

One or more sensors 15 may include image sensors, cameras, depth sensors, remote sensors, and/or other sensors. One or more sensors 15 may be configured to capture information. Individual sensors may be configured to capture information, including but not limited to visual information, video information, audio information, geolocation information, orientation and/or motion information, depth information, and/or other information.

Sensor control subsystem 16 may be configured to control one or more sensors 15 included in UAV 10, and/or other sensors. Operation of sensor control subsystem 16 may be based on sensor control information. Sensor control information may be based on information and/or parameters determined and/or obtained by UAV 10 and/or components thereof. In some implementations, sensor control information may be transmitted by remote controller 17. In some implementations, sensor control information may be received by controller interface 18. In some implementations, sensor control subsystem 16 may be configured to control one or more image sensors 15 such that the visual information captured by one or more image sensors 15 includes an image of a particular object or user, e.g. user 101 as depicted in FIG. 2.

Figure 2:
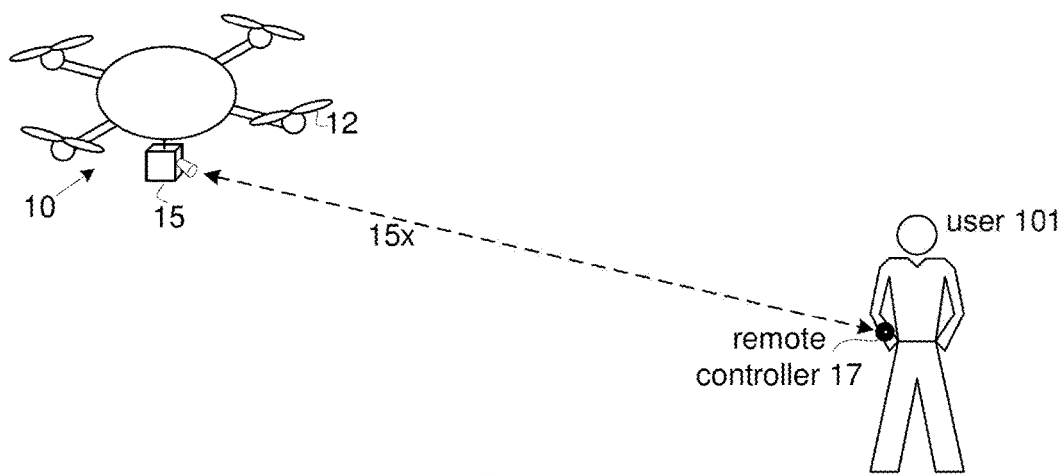
FIG. 2 schematically illustrates a scene including an unmanned aerial vehicle and a user in accordance with one or more implementations.

By way of non-limiting example, FIG. 2 illustrates a scene including UAV 10 and user 101. Sensor 15 of UAV 10 is aimed in a direction as indicated by direction 15$x$ to capture information that includes one or both of remote controller 17 and user 101. Remote controller 17 may be configured to transmit information to UAV 10, e.g. in a direction as indicated by direction 15$x$. In some implementations, UAV 10 may be configured to follow and/or track user 101 as he moves and/or otherwise adjusts his position and/or location. In some implementations, UAV 10 and/or components thereof may be configured to adjust sensor 15 responsive to movement by user 101 such that user 101 continues to be included in the image information captured by sensor 15. In some implementations, UAV 10 may be configured to maintain a target distance, elevation, and/or cardinal direction relative to remote controller 17, user 101, and/or another targeted object or person. In some implementations, sensor control subsystem 16 may be configured to capture a particular side of an object or person, e.g. the face of user 101, and effectuate adjustments in the position of UAV 10 to accomplish such a target or goal.

Referring to FIG. 1, one or more physical processors 110 may be configured via computer-readable instructions to provide information-processing capabilities and/or execute computer program components. The computer program components may include one or more of a parameter determination component 20, a flight control component 21, a sensor control component 22, a gesture interpretation component 23, a projection component 24, a pattern recognition component 25, and/or other components. As depicted in FIG. 1, UAV 10 includes two separate instances of physical processor 110 that are included in flight control subsystem 14 and in sensor control subsystem 16. The number of physical processors 110 is not intended to be limited in any way by the depiction in FIG. 1. The partitioning of physical processors 110 under any component of UAV 10 or any control subsystem is not intended to be limited in any way by the depiction in FIG. 1.

Parameter determination component 20 may be configured to determine flight parameters and/or other parameters related to UAV 10. Determinations by parameter determination component 20 may be based on output signals from one or more sensors 15. For example, parameter determination component 20 may be configured to determine an altitude of UAV 10 based on a sensor 15a, e.g. an altimeter. For example, parameter determination component 20 may be configured to determine a distance between UAV 10 and use 101 or remote controller 17 based on information from sensor 15a, e.g. an image sensor.

Flight control component 21 may be configured to determine control parameters based on output signals from sensors, flight parameters, and/or other parameters. Control parameters may control operation of UAV 10. Control parameters may be used to provide flight control for UAV 10. In some implementations, control parameters may include particular targets or goals for UAV 10 and/or for one or more flight parameters of UAV 10. For example, a control parameter may include or be related to one or more of a particular destination, a particular flight path, a target altitude, a target arrival time and/or flight duration, and/or other targets or goals for UAV 10. By way of non-limiting example, flight control subsystem 14 may be configured to control one or more of altitude, longitude, latitude, geographical location, heading, and/or speed of UAV 10, and/or other control parameters.

Sensor control component 16 may be configured to determine sensor parameters based on output signals from one or more sensors 15, flight parameters, and/or other parameters. Sensor parameters may control operation of one or more sensors. For example, sensor parameters may be related to the operation of an image sensor 15a. By way of non-limiting example, sensor control subsystem 16 may be configured to control one or more sensors 15 through adjustments of one or more of aperture timing, exposure, focal length, angle of view, depth of field, focus, light metering, white balance, resolution, frame rate, object of focus, capture angle, a zoom parameter, video format, a sound parameter, a compression parameter, and/or other sensor parameters.

Gesture interpretation component 23 may be configured to recognize and/or interpret gestures from users, including but not limited to user 101. In some implementations, gestures may be recognized and/or interpreted by capturing depth information that includes user 101 and analyzing patterns, positions, and/or movements of user 101, or parts of the body of user 101. By way of non-limiting example, gesture interpretation component 23 may be configured to determine and/or recognize one or more patterns, positions, and/or movements of the hands of user 101. In some implementations, individual particular patterns, positions, and/or movements of the hands of user 101 may correspond to particular commands and/or requests to UAV 10 to perform an action or operation. Performance of an action or operation by UAV 10 and/or components thereof may correspond to one or both of flight control information and sensor control information. Performance of an action or operation by UAV 10 and/or components thereof may be implemented by one or more of flight control subsystem 14, sensor control system 16, flight control component 21, sensor control component 22, gesture interpretation component 23, pattern recognition component 25, and/or other components of UAV 10. By way of non-limiting example, gestures may be interpreted as one or both of flight control information and sensor control information. In some implementations, features attributed to gesture interpretation component 24 may be performed at or near user 101 and/or another user. In some implementations, features attributed to gesture interpretation component 24 may be performed at or near UAV 10 and/or components thereof. In some implementations, features attributed to gesture interpretation component 24 may be performed in part at or near user 101 and/or another user, and in part at or near UAV 10 and/or components thereof.

For example, one or more gestures may be interpreted to adjust the altitude differential between UAV 10 and one or more of remote controller 17, user 101, and/or another targeted object or person. For example, a gesture by user 101 of raising both hands above the head of user 101 may indicate a command and/or request for UAV 10 to increase its altitude. Such a command and/or request may correspond to control parameters and/or flight control information that may be used by flight control subsystem 14 to control the position and/or movement of UAV 10. A gesture by user 101 of moving both hands from being outstretched and horizontal to straight down and pointing to the ground may indicate a command and/or request for UAV 10 to decrease its altitude. A gesture by user 101 of aiming, poking, and/or thrusting toward an object or person may indicate a command and/or request for UAV 10 to follow and/or track that particular object and/or person instead of, e.g., user 101. Gestures described in this disclosure are merely exemplary and not intended to be limiting in any way.

In some implementations, gestures may be accompanied by other types of user input, including but not limited to an auditory command, a manipulation of a user interface element (e.g. a button or switch), a tactile action (e.g. tapping the remote controller twice to prime the system for recognizing a gesture), and/or other types of user input. As used in this disclosure, gestures, interpretations, commands, and requests are types of information that may be transmitted by remote controller 17, received by controller interface 18, and/or processed by one or more control subsystems and/or computer program components.

In some implementations, one or more gestures may be interpreted to adjust the distance between UAV 10 and one or more of remote controller 17, user 101, and/or another targeted object or person. In some implementations, one or more gestures may be interpreted to adjust the zooming factor of image sensor 15a, e.g. to capture a wider shot or a more narrow shot of a scene including remote controller 17, user 101, and/or another targeted object or person. Such a command and/or request to adjust the zooming factor may correspond to sensor parameters and/or sensor control information that may be used by sensor control subsystem 16 to control the operation of one or more sensors 15.

In some implementations, one or more gestures may be interpreted to adjust the cardinal direction between UAV 10 and one or more of remote controller 17, user 101, and/or another targeted object or person. For example, the current cardinal direction (prior to a particular gesture) may be that UAV 10 is positioned East of remote controller 17. Subsequent to a particular gesture, UAV 10 may maneuver itself such that UAV 10 is positioned South of remote controller 17. In some implementations, one or more gestures may be interpreted to rotate UAV 10 by a predetermined number of degrees around remote controller 17, user 101, and/or another targeted object or person. The predetermined number of degrees may be about 30, 45, 60, 90, 120, 180, and/or another number of degrees.

In some implementations, one or more gestures may be interpreted as meta-information regarding the information being captured by one or more sensors 15. For example, a particular gesture may mark, timestamp, annotate, and/or otherwise process information captured by one or more sensors 15. In some implementations, a particular gesture may be used to synchronize, align, annotate, and/or otherwise associate captured information with a particular person, object, moment, and/or duration/event.

Figure 3:
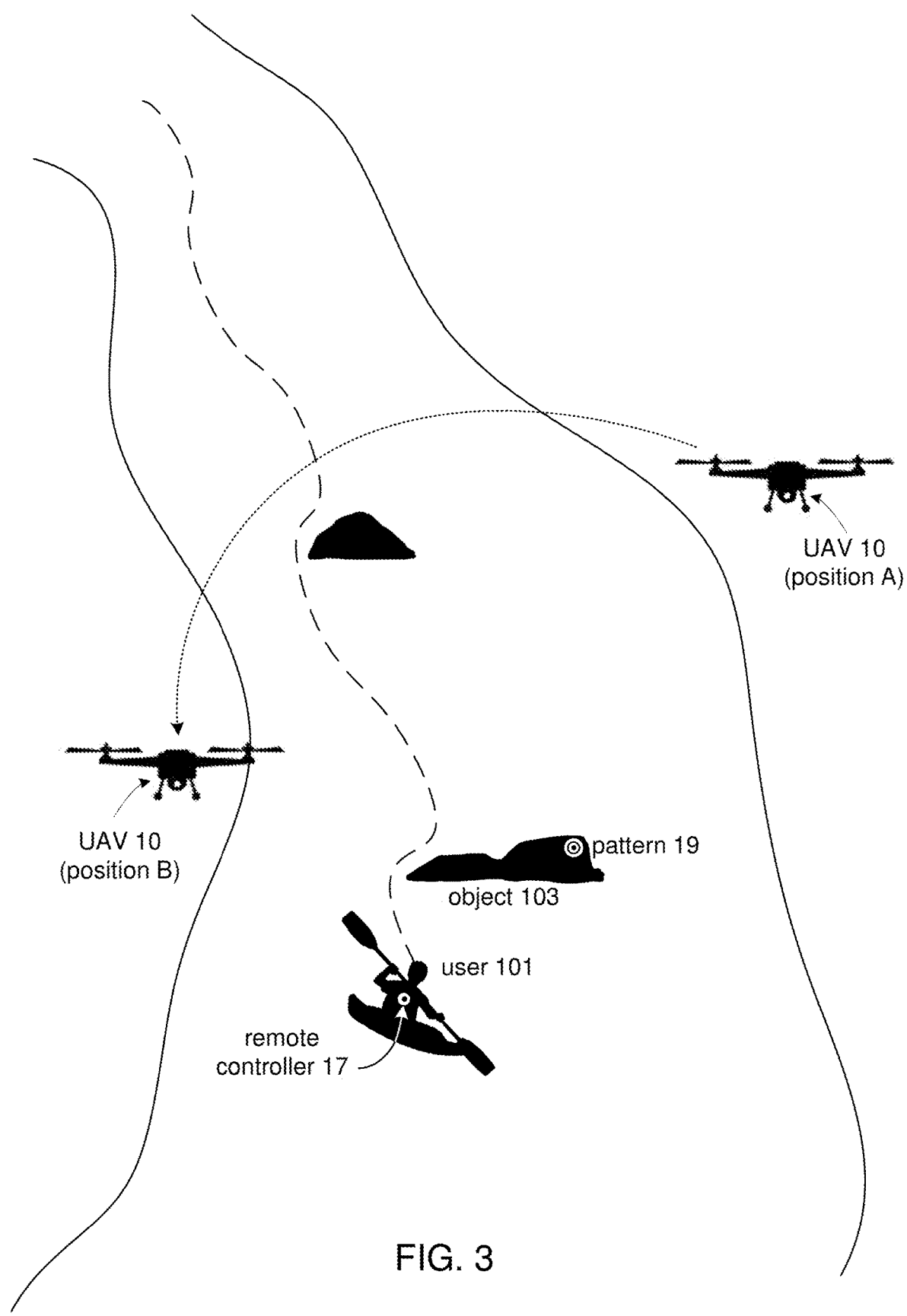
FIG. 3 schematically illustrates a scene including an unmanned aerial vehicle and a user in accordance with one or more implementations.

By way of non-limiting example, FIG. 3 illustrates a scene including UAV 10 and user 101. In the case illustrated in FIG. 3, UAV 10 may be configured to follow and/or track user 101 as he is kayaking. Remote controller 17 may be configured to recognize a gesture by user 101. The gesture may be interpreted as a command and/or request to UAV 10 to rotate UAV 10 by about 180 degrees around remote controller 17 and/or user 101, thus moving from position A to position B, as indicated in FIG. 3.

Referring to FIG. 1, projection component 24 may be configured to project a pattern on an object or user, e.g. user 101. In some implementations, the pattern may be a visual pattern. For example, the pattern may include a barcode, a QR code, a target, and/or other patterns, and/or combinations thereof. In some implementations, projection component 24 may include and/or control a component configured to emit electromagnetic radiation. The electromagnetic radiation may produce a pattern, e.g. a visual pattern. In some implementations, particular information (including but not limited to commands, requests, targets, goals, etc.) may be embedded in a pattern. For example, flight control information and/or sensor control information may be entered, received, and/or confirmed through a user interface associated with remote controller 17. This information may be converted to, embedded in, and/or otherwise processed into one or more patterns for projection, e.g., by projection component 24.

Pattern recognition component 25 may be configured to recognize and/or interpret patterns, including but not limited to patterns projected by projection component 24. By way of non-limiting example, patterns may be interpreted as one or both of flight control information and sensor control information. For example, a pattern may be used to tag an object or person such that, subsequent to being tagged, UAV 10 may be configured to follow and/or track the tagged object or person. In some implementations, features attributed to pattern recognition component 25 may be performed at or near user 101 and/or another user. In some implementations, features attributed to pattern recognition component 25 may be performed at or near UAV 10 and/or components thereof. In some implementations, features attributed to pattern recognition component 25 may be performed in part at or near user 101 and/or another user, and in part at or near UAV 10 and/or components thereof.

By way of non-limiting example, FIG. 3 illustrates a scene including UAV 10, user 101, a pattern 19, and an object 103. In the case illustrated in FIG. 3, UAV 10 may be configured to follow and/or track user 101 as he is kayaking. User 101 may have used the functionality attributed to projection component 24 (which may be integrated into remote controller 17) to project a pattern 19 on object 103. Pattern recognition component 25 (which may be integrated in UAV 10) may recognize pattern 19. For example, pattern recognition component 25 may be configured to analyze visual information captured by image sensor 15a (shown in FIG. 1). The captured visual information may include images of pattern 19. Pattern 19 may be interpreted as a command and/or request to UAV 10 to perform an action or operation related to object 103, and/or to mark the current moment in relation to the captured information. Performance of an action or operation by UAV 10 and/or components thereof may correspond to one or both of flight control information and sensor control information. Performance of an action or operation by UAV 10 and/or components thereof may be implemented by one or more of flight control subsystem 14, sensor control system 16, flight control component 21, sensor control component 22, gesture interpretation component 23, pattern recognition component 25, and/or other components of UAV 10. For example, UAV 10 may be configured to capture image information (through an image sensor) that includes images of an object (here, object 103) tagged by pattern 19. For example, the action may be taking a high-resolution and/or up-close photograph of object 103. For example, the action may be to timestamp the exact moment when user 101 was close to an object of interest (such as object 103). For example, video information captured by one or more sensors 15 may be processed, subsequent to the video information being captured, based on the timestamp. In some implementations, the captured information may be used to create multimedia content based on the captured information.

Figure 4:
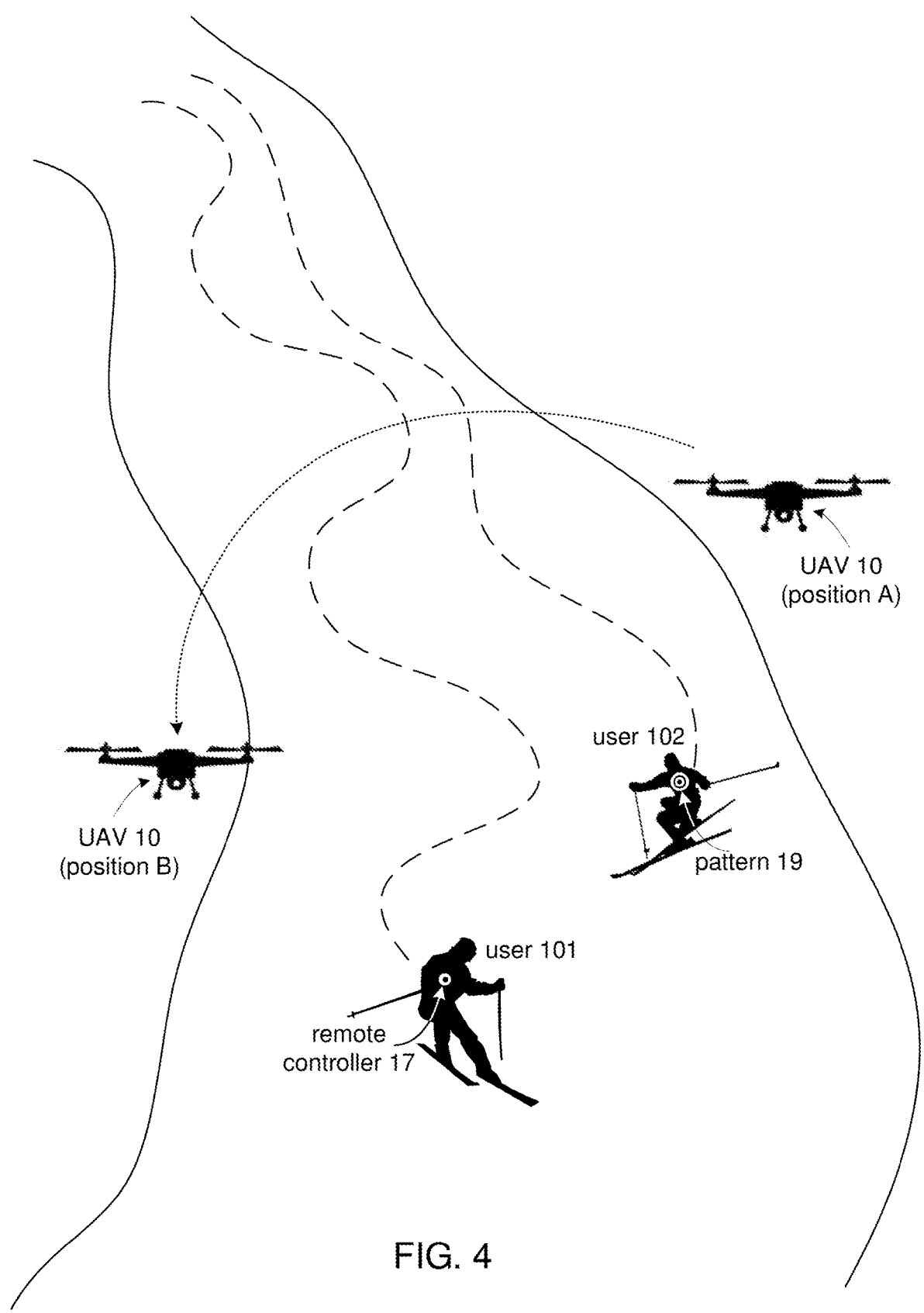
FIG. 4 schematically illustrates a scene including an unmanned aerial vehicle and two users in accordance with one or more implementations.

By way of non-limiting example, FIG. 4 illustrates a scene including UAV 10, user 101, user 102, and pattern 19. In the case illustrated in FIG. 4, UAV 10 may be configured to follow and/or track user 101 as he is skiing. User 101 may have used the functionality attributed to projection component 24 (which may be integrated into remote controller 17) to project a pattern 19 on user 102. Pattern recognition component 25 (which may be integrated in UAV 10) may recognize pattern 19. Pattern 19 may be interpreted as a command and/or request to UAV 10 to perform an action or operation related to user 102. For example, UAV 10 may be configured to capture image information that includes images of the user (here, user 102) tagged by pattern 19. For example, UAV 10 may be instructed to follow and/or track user 102 instead of user 101. In some implementations, different patterns may be interpreted as a command and/or request to UAV 10 to perform an action or operation related to both user 101 and user 102. For example, in some implementations, pattern 19 may be interpreted as an instruction to include both user 101 and user 102 in the visual information captured by the sensor of UAV 10, to the extent possible and/or feasible, but with a preference for including user 102. Alternatively, the preference may be to include 101. In some implementations, the preference may be to exclude user 101, such that UAV 10 is maneuvered in a position to capture visual information that includes user 102 but not user 101.

In some implementations, pattern recognition component 25 may be configured to recognize a set and/or sequence of patterns involving multiple people and/or multiple objects (e.g. more than two people and/or objects). The set and/or sequence of patterns may indicate a compound command and/or request involving particular flight control information and particular sensor control information. For example, UAV 10 may be instructed to alternate between positions suitable to capture visual information of user 101 and user 102 until either user is in proximity of object 103, at which point UAV 10 is instructed to capture a wide-angle high-resolution image including both users. In some implementations, the compound command and/or request may include a sequence of commands, requests, targets, goals, and (hierarchically interpreted) preferences with regard to the position/operation of UAV 10 and the operation of one or more sensors 15.

In some implementations, a user may tag multiple locations and/or objects within a particular area, e.g. a skate park, by projecting patterns that have particular information embedded within them. The embedded information may include commands, requests, targets, and/or goals for the operation of UAV 10, including but not limited to flight control information and/or sensor control information. For example, pattern recognition component 25 may recognize and interpret a first pattern on a first object within the particular area as requiring a slow-motion video capture if remote controller 17 is in close proximity of the first object. For example, pattern recognition component 25 may recognize and interpret a second pattern on a second object within the particular area as requiring a wide-angle high-resolution panning capture if remote controller 17 is in close proximity of the second object. For example, a user may direct and/or setup a set and/or sequence of patterns, commands, requests for the operation of UAV 10. In some implementations, information may be sent from remote controller 17 to controller interface 18 by a combination of direct transmission and projected patterns that are recognized and interpreted upon being captured by an image sensor.

Remote controller 17 may be configured to transmit information, including but not limited to flight control information, sensor control information, and/or other information. In some implementations, remote controller 17 may be a separate, distinct, and/or physically independent component of UAV 10. In some implementations, remote controller 17 may be a separate, distinct, and/or physically independent component from housing 11. In some implementations, remote controller 17 may be configured to be supported, worn, held, and/or carried by a user, e.g. user 101. In some implementations, remote controller 17 may include a user interface (e.g. user interface 76) configured to receive user input. The user input may include flight control information, sensor control information, and/or other information. In some implementations, the user input may include gestures by a user. In some implementations, gesture interpretation component 25 may be included in remote controller 17.

Controller interface 18 may be configured to determine and/or receive flight control information, sensor control information, and/or other information. For example, controller interface 18 may be configured to receive flight control information and/or sensor control information from remote controller 17. In some implementations, the controller interface may be included, combined, embedded, and/or otherwise form an integral part of UAV 10 and/or housing 11.

The depiction in FIG. 1 of flight control subsystem 14 including and/or executing parameter determination component 20 is not intended to be limiting in any way. In some implementations, parameter determination component 20 may be included in and/or executed by sensor control subsystem 16 and/or any other component of UAV 10. The location or depiction of a particular computer program component in FIG. 1 is merely exemplary, and not intended to be limiting in any way.

One or more physical processors 110 may include one or more of a digital processor, an analog processor, a digital circuit designed to process information, a central processing unit, a graphics processing unit, an analog circuit designed to process information, and/or other mechanisms for electronically processing information. In some implementations, physical processor 110 may include a plurality of processing units.

It should be appreciated that although components 20-25 are illustrated in FIG. 1 as being located and/or co-located within a particular component of UAV 10, in implementations in which physical processor 110 includes multiple processing units, one or more of components 20-25 may be located remotely from the other components. The description of the functionality provided by the different components 20-25 described herein is for illustrative purposes, and is not intended to be limiting, as any of components 20-25 may provide more or less functionality than is described. For example, one or more of components 20-25 may be eliminated, and some or all of its functionality may be incorporated, shared, integrated into, and/or otherwise provided by other ones of components 20-25. Note that physical processor 110 may be configured to execute one or more additional components that may perform some or all of the functionality attributed below to one of components 20-25.

Electronic storage 50 in FIG. 1 comprises electronic storage media that electronically stores information. The electronic storage media of electronic storage 50 may include one or both of system storage that is provided integrally (i.e., substantially non-removable) with UAV 10 and/or removable storage that is connectable to UAV 10 via, for example, a port (e.g., a USB port, a Firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 50 may store software algorithms, information determined by physical processor 110 or any computer program components, information received via user interface 76, and/or other information that enables UAV 10 to function properly. For example, electronic storage 50 may store captured visual information (as discussed elsewhere herein), and/or other information. Electronic storage 50 may be a separate component within UAV 10, or electronic storage 50 may be provided integrally with one or more other components of UAV 10 (e.g., physical processor 110).

User interface 76 of UAV 10 in FIG. 1 may be configured to provide an interface between UAV 10 and a user (e.g. a remote user using a graphical user interface) through which the user can provide information to and receive information from UAV 10. This enables data, results, and/or instructions and any other communicable items, collectively referred to as "information," to be communicated between the user and UAV 10. An example of information that may be conveyed to a user is an indication of a flight parameter, a control parameter, etc. Examples of interface devices suitable for inclusion in user interface 76 include a keypad, buttons, switches, a keyboard, knobs, levers, a display screen, a touch screen, speakers, a microphone, an indicator light, an audible alarm, and a printer. Information may be provided to a user by user interface 76 in the form of auditory signals, visual signals, tactile signals, and/or other sensory signals.

It is to be understood that other communication techniques, either hard-wired or wireless, are also contemplated herein as user interface 76. For example, in one embodiment, user interface 76 may be integrated with a removable storage interface provided by electronic storage 50. In this example, information is loaded into UAV 10 from removable storage (e.g., a smart card, a flash drive, a removable disk, etc.) that enables the user(s) to customize UAV 10. Other exemplary input devices and techniques adapted for use with UAV 10 as user interface 76 include, but are not limited to, an RS-232 port, RF link, an IR link, modem (telephone, cable, Ethernet, internet or other). In short, any technique for communicating information with UAV 10 is contemplated as user interface 76.

Figure 5:
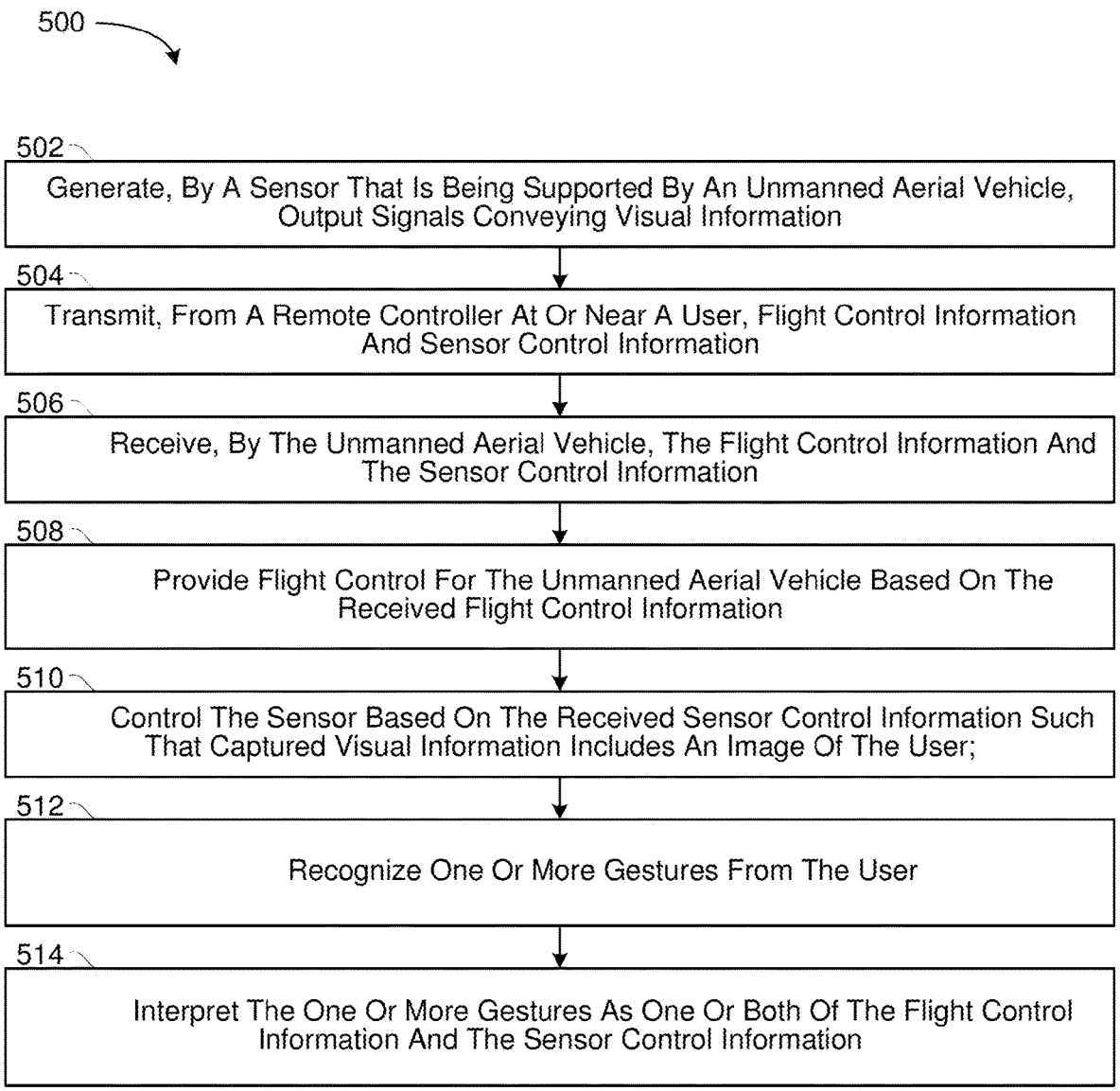
FIG. 5 illustrates a method for controlling an unmanned aerial vehicle in accordance with one or more implementations.

FIG. 5 illustrates a method 500 for controlling an unmanned aerial vehicle. The operations of method 500 presented below are intended to be illustrative. In certain implementations, method 500 may be accomplished with one or more additional operations not described, and/or without one or more of the operations discussed. Additionally, the order in which the operations of method 500 are illustrated in FIG. 5 and described below is not intended to be limiting.

In certain implementations, method 500 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

Regarding method 500, at an operation 502, output signals are generated that convey visual information. In some embodiments, operation 502 is performed by a sensor the same as or similar to sensor 15 (shown in FIG. 1 and described herein).

At an operation 504, flight control information and sensor control information are transmitted. In some embodiments, operation 504 is performed by a remote controller the same as or similar to remote controller 17 (shown in FIG. 2 and described herein).

At an operation 506, the flight control information and the sensor control information are received. In some embodiments, operation 506 is performed by a controller interface the same as or similar to controller interface 18 (shown in FIG. 1 and described herein).

At an operation 508, flight control for the unmanned aerial vehicle is provided based on the flight control information. In some embodiments, operation 508 is performed by a flight control subsystem the same as or similar to flight control subsystem 14 (shown in FIG. 1 and described herein).

At an operation 510, the sensor is controlled based on the sensor control information such that the visual information includes an image of a user. In some embodiments, operation 510 is performed by a sensor control subsystem the same as or similar to sensor control subsystem 16 (shown in FIG. 1 and described herein).

At an operation 512, one or more gestures from the user are recognized. In some embodiments, operation 512 is performed by a gesture interpretation component and/or a controller interface the same as or similar to gesture interpretation component 25 and/or controller interface 18, respectively (shown in FIG. 1 and described herein). Recognition of gestures may be performed at or near the location of the user, at or near the location of the unmanned aerial vehicle, and/or both.

At an operation 514, the one or more gestures are interpreted as one or both of the flight control information and the sensor control information. In some embodiments, operation 514 is performed by a gesture interpretation component and/or a controller interface the same as or similar to gesture interpretation component 25 and/or controller interface 18, respectively (shown in FIG. 1 and described herein). Interpretation of gestures may be performed at or near the location of the user, at or near the location of the unmanned aerial vehicle, and/or both.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system for controlling an unmanned aerial vehicle, the system comprising:
    an image sensor configured to generate output signals conveying visual information, the visual information including one or more images of a user; and
    one or more physical processors configured by computer-readable instructions to:
        recognize one or more gestures from the user based on the visual information;
        interpret the one or more gestures from the user as flight control information; and
        provide flight control for the unmanned aerial vehicle based on the flight control information.

2. The system of claim 1, wherein the one or more physical processors are further configured by the computer-readable instructions to:
    interpret the one or more gestures from the user as sensor control information; and control the image sensor based on the sensor control information.

3. The system of claim 2, wherein to control the image sensor based on the sensor control information comprises to:
control the image sensor through adjustments of any of aperture timing, exposure, focal length, angle of view, depth of field, focus, light metering, white balance, resolution, frame rate, object of focus, capture angle, a zoom parameter, video format, a sound parameter, and a compression parameter.

4. The system of claim 2, further comprising:
a remote controller configured to provide any of the flight control information and the sensor control information to the one or more physical processors.

5. The system of claim 4, wherein the remote controller is further configured to be carried or worn by the user.

6. The system of claim 4, wherein the remote controller is further configured to project a pattern on an object, wherein the one or more physical processors is further configured by the computer-readable instructions to:
recognize the pattern based on the visual information; and
interpret the pattern as any of the flight controller information and the sensor control information.

7. The system of claim 4, wherein the one or more physical processors are further configured by the computer-readable instructions to:
provide the flight control for the unmanned aerial vehicle such that a target altitude differential between the unmanned aerial vehicle and the remote controller is maintained,
wherein the one or more gestures include a gesture interpreted by the one or more physical processors to adjust the target altitude differential.

8. The system of claim 4, wherein the one or more physical processors are further configured by the computer-readable instructions to:
provide the flight control for the unmanned aerial vehicle such that a target cardinal direction between the unmanned aerial vehicle and the remote controller is maintained,
wherein the one or more gestures include a gesture interpreted by the one or more physical processors to adjust the target cardinal direction.

9. The system of claim 4, wherein the one or more physical processors are further configured by the computer-readable instructions to:
provide the flight control for the unmanned aerial vehicle such that a target distance between the unmanned aerial vehicle and the remote controller is maintained,
wherein the one or more gestures include a gesture interpreted by one or more physical processors to adjust the target distance.

10. The system of claim 4, wherein the one or more physical processors are further configured by the computer-readable instructions to:
provide the flight control for the unmanned aerial vehicle such that a target distance between the unmanned aerial vehicle and the remote controller is maintained,
wherein the one or more gestures include a gesture interpreted by the one or more physical processors to rotate the unmanned aerial vehicle around the remote controller by a predetermined number of degrees.

11. The system of claim 1, wherein the one or more physical processors are further configured by the computer-readable instructions to:
provide the flight control for the unmanned aerial vehicle such that a target distance between the unmanned aerial vehicle and an object is maintained,
wherein the one or more gestures include a gesture interpreted by the one or more physical processors to adjust the target distance.

12. The system of claim 1, wherein the flight control includes control of any of altitude, longitude, latitude, geographical location, heading, and speed of the unmanned aerial vehicle.

13. A method for controlling an unmanned aerial vehicle, the method being implemented in a system including a sensor and a processor, the method comprising:
recognizing one or more gestures from a user based on visual information of the user;
interpreting the one or more gestures from the user as flight control information; and
providing flight control for the unmanned aerial vehicle based on the flight control information.

14. The method of claim 13, further comprising:
interpreting the one or more gestures from the user as sensor control information; and
controlling the sensor based on the sensor control information.

15. The method of claim 14, wherein controlling the sensor based on the sensor control information comprises:
controlling the sensor through adjustments of any of aperture timing, exposure, focal length, angle of view, depth of field, focus, light metering, white balance, resolution, frame rate, object of focus, capture angle, a zoom parameter, video format, a sound parameter, and a compression parameter.

16. The method of claim 14, further comprising:
receiving any of the flight control information and the sensor control information from a remote controller.

17. The method of claim 16, wherein the remote controller is further configured to project a pattern on an object, the method further comprising:
recognizing the pattern based on the visual information; and
interpreting the pattern as any of the flight controller information and the sensor control information.

18. The method of claim 16, wherein providing the flight control for the unmanned aerial vehicle based on the flight control information comprises:
maintaining a target altitude differential between the unmanned aerial vehicle and the remote controller; and
interpreting the one or more gestures to effectuate an adjustment of the target altitude differential.

19. The method of claim 13, wherein providing the flight control for the unmanned aerial vehicle based on the flight control information comprises:
maintaining a target distance between the unmanned aerial vehicle and an object; and
interpreting the one or more gestures to effectuate an adjustment of the target distance.

20. The method of claim 13, wherein the flight control includes control of any of altitude, longitude, latitude, geographical location, heading, and speed of the unmanned aerial vehicle.

* * * * *